United States Patent
Kuffel et al.

(10) Patent No.: US 8,496,384 B2
(45) Date of Patent: Jul. 30, 2013

(54) REVERSIBLE FIBER OPTIC CONNECTOR

(71) Applicant: Panduit Corp, Tinley Park, IL (US)

(72) Inventors: Gregory L. Kuffel, Plainfield, IL (US);
Samuel M. Marrs, Bradley, IL (US);
Shaun P. Brouwer, St. John, IN (US);
Robert T. Fitzpatrick, New Lenox, IL
(US); Phillip J. Irwin, Mokena, IL (US);
Matthew M. Wagner, Park Forest, IL
(US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 13/735,450

(22) Filed: Jan. 7, 2013

(65) Prior Publication Data

US 2013/0136402 A1    May 30, 2013

Related U.S. Application Data

(63) Continuation of application No. 13/542,271, filed on Jul. 5, 2012, now Pat. No. 8,348,519, and a continuation of application No. 13/286,877, filed on Nov. 1, 2011, now Pat. No. 8,231,282, and a continuation of application No. 13/010,952, filed on Jan. 21, 2011, now Pat. No. 8,052,333, and a continuation of application No. 12/697,905, filed on Feb. 1, 2010, now Pat. No. 7,891,882, and a continuation of application No. 11/761,756, filed on Jun. 12, 2007, now Pat. No. 7,654,748, and a continuation of application No. 11/423,817, filed on Jun. 13, 2006, now Pat. No. 7,241,056.

(51) Int. Cl.
*G02B 6/38* (2006.01)
*G02B 6/00* (2006.01)

(52) U.S. Cl.
USPC .................. 385/60; 385/56; 385/58; 385/147

(58) Field of Classification Search
None
See application file for complete search history.

(56) References Cited

U.S. PATENT DOCUMENTS

| | | | |
|---|---|---|---|
| 4,634,214 | A | 1/1987 | Cannon, Jr. et al. |
| 4,923,274 | A | 5/1990 | Dean |
| 4,964,685 | A | 10/1990 | Savitsky et al. |
| 5,170,452 | A | 12/1992 | Ott |
| 5,261,019 | A | 11/1993 | Beard et al. |

(Continued)

FOREIGN PATENT DOCUMENTS

| | | |
|---|---|---|
| JP | 05281440 A | 10/1993 |
| WO | 2005004285 A2 | 1/2005 |

*Primary Examiner* — Rhonda Peace
(74) *Attorney, Agent, or Firm* — Christopher S. Clancy; Christopher K. Marlow

(57) ABSTRACT

A re-terminable, no-crimp ST-type optical connector assembly includes a spring-loaded ferrule holder assembly and a reusable activation system for termination of the assembly. The optical connector can be terminated by a suitable cam activation tool. The connector includes a housing, such as a bayonet, matable to a mating adapter, a backbone retained within a rear of the housing, a ferrule holder provided within the backbone, and a cam provided between the ferrule holder and the backbone. The ferrule holder includes an alignment key exposed to mate with a cam activation tool to lock rotation of the ferrule holder relative to other connector components. The cam includes a cam activation cutout at a front face thereof that mates with a cam activation tool interface to enable rotation of the cam between de-activated and activated positions, the cam activation cutout also receiving the alignment key of the ferrule holder therethrough.

5 Claims, 20 Drawing Sheets

U.S. PATENT DOCUMENTS

| | | | |
|---|---|---|---|
| 5,261,020 A | 11/1993 | De Jong et al. | |
| 5,524,159 A | 6/1996 | Turgeon et al. | |
| 5,577,144 A | 11/1996 | Rossana et al. | |
| 5,748,819 A | 5/1998 | Szentesi et al. | |
| 5,828,806 A | 10/1998 | Grois et al. | |
| 5,915,056 A | 6/1999 | Bradley et al. | |
| 5,923,804 A | 7/1999 | Rosson | |
| 6,022,150 A | 2/2000 | Erdman et al. | |
| 6,062,739 A | 5/2000 | Blake et al. | |
| 6,068,410 A | 5/2000 | Giebel et al. | |
| 6,173,097 B1 | 1/2001 | Throckmorton et al. | |
| 6,179,482 B1 | 1/2001 | Takizawa et al. | |
| 6,224,270 B1 | 5/2001 | Nakajima et al. | |
| 6,234,685 B1 | 5/2001 | Carlisle et al. | |
| 6,238,101 B1 | 5/2001 | Chen et al. | |
| 6,379,054 B2 | 4/2002 | Throckmorton et al. | |
| 6,439,780 B1 | 8/2002 | Mudd et al. | |
| 6,533,468 B2 | 3/2003 | Nakajima et al. | |
| 6,648,521 B2 | 11/2003 | Rochrs et al. | |
| 6,705,766 B2 | 3/2004 | Lecomte et al. | |
| 6,816,661 B1 | 11/2004 | Barnes et al. | |
| 7,011,454 B2 | 3/2006 | Caveney et al. | |
| 7,178,990 B2 | 2/2007 | Caveney et al. | |
| 7,189,008 B2 | 3/2007 | Dye | |
| 7,241,056 B1 * | 7/2007 | Kuffel et al. | 385/60 |
| 8,052,333 B2 | 11/2011 | Kuffel et al. | |
| 8,231,282 B2 * | 7/2012 | Kuffel et al. | 385/60 |
| 2004/0184739 A1 | 9/2004 | Rondeau et al. | |
| 2005/0213890 A1 | 9/2005 | Barnes et al. | |
| 2005/0244108 A1 | 11/2005 | Billman et al. | |
| 2006/0093300 A1 | 5/2006 | Marrs et al. | |
| 2006/0165352 A1 | 7/2006 | Caveney et al. | |
| 2007/0217745 A1 | 9/2007 | Semmler et al. | |

* cited by examiner

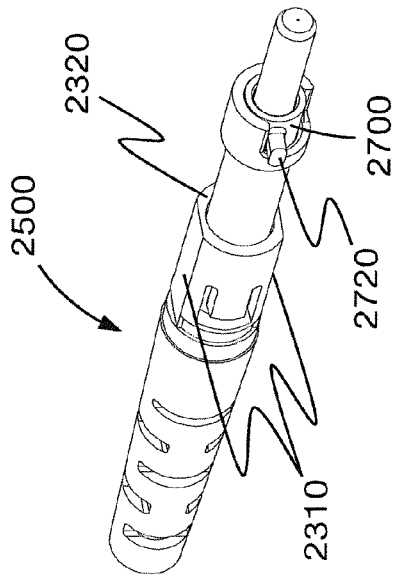
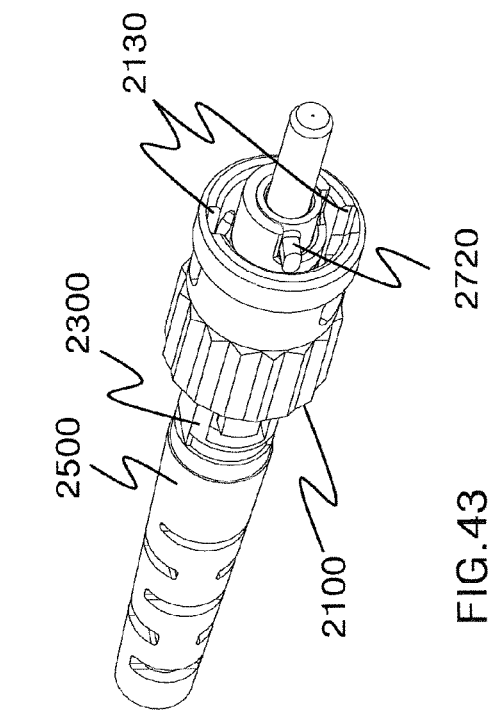
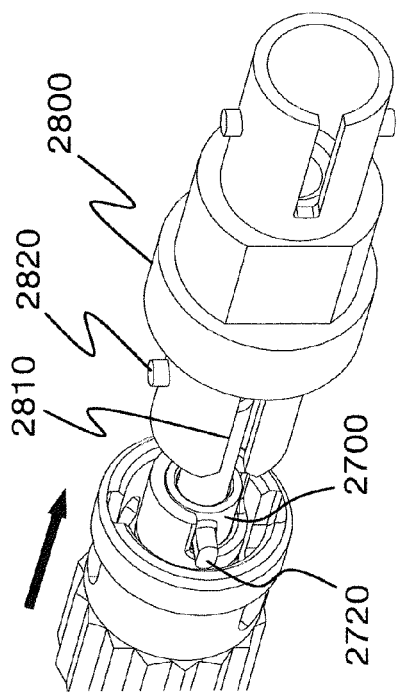

REVERSIBLE FIBER OPTIC CONNECTOR

CROSS-REFERENCE TO RELATED APPLICATIONS

This application is a continuation of U.S. application Ser. No. 13/542,271, filed Jul. 5, 2012; which is a continuation of U.S. application Ser. No. 13/286,877, filed Nov. 1, 2011, which issued as U.S. Pat. No. 8,231,282 on Jul. 31, 2012; which is a continuation of U.S. application Ser. No. 13/010,952, filed Jan. 21, 2011, which issued as U.S. Pat. No. 8,052,333 on Nov. 8, 2011; which is a continuation of U.S. application Ser. No. 12/697,905, filed Feb. 1, 2010, which issued as U.S. Pat. No. 7,891,882 on Feb. 22, 2011; which is a continuation of U.S. application Ser. No. 11/761,756, filed Jun. 12, 2007, which issued as U.S. Pat. No. 7,654,748 on Feb. 2, 2010, which is a continuation of U.S. application Ser. No. 11/423,817, filed Jun. 13, 2006, which issued as U.S. Pat. No. 7,241,056 on Jul. 10, 2007, the subject matter of which is hereby incorporated herein by reference in its entirety.

BACKGROUND

1. Field of Invention

A re-terminable, no-crimp ST-type optical connector assembly includes a spring-loaded ferrule holder assembly and a reusable activation system for termination of the assembly. The optical connector can be terminated by a suitable cam activation tool.

2. Description of Related Art

Fiber optic networks are becoming increasingly commonplace in telecommunications applications due to their increased bandwidth and distance capabilities relative to copper networks. However, compared to copper systems, fiber optic cables and connections are well known for their more critical and difficult termination.

Alignment between abutted glass cores within a fiber optic interface is crucial to the performance of the connection. Additionally, field installation of standard "pot and finish" fiber optic connectors is extremely labor and expertise intensive. In most applications, an installer is required to prepare a fiber end, glue the fiber end in the connector, cleave the excess fiber from the end face of the connector, and polish the end face of the connector to obtain the optimum geometry for optical performance. End face polishing is a difficult and time-consuming step, particularly when using single mode fiber, which achieves its best performance when using an automated polishing machine. However, automated polishing machines are often large and expensive, rendering them impractical for field use.

Fiber pigtails connectors eliminate the need for such lengthy steps and are factory prepared with a length of fiber. However, these require a fusion splicing machine and protective sleeve, which are expensive.

Fiber stub connectors were designed to eliminate the need for fusion splicing equipment and lengthy termination steps. The fiber stub employs a short fiber stub that is spliced to the field fiber within the connector. Stub connectors typically require a crimp to activate the splice or retain the field fiber, or both. However, the crimping operations, whether occurring at the interface point or some other point to retain the field fiber, have a tendency to pull the field fiber and stub fiber apart, or otherwise damage the signal passing function of the interface.

Moreover, if the connection is found to be poor after crimping, the connection must be cutoff because crimping is most often an irreversible operation. This wastes a stub fiber connector and a length of fiber optical cable and requires a new connector and fiber optical cable end to be terminated.

Recently reusable or re-terminable fiber stub connectors have been developed, such as that disclosed in commonly assigned U.S. application Ser. No. 10/647,848 filed Aug. 25, 2003, the subject matter of which is hereby incorporated herein by reference in its entirety. Another known reusable or re-terminable fiber stub connector is disclosed in commonly assigned U.S. application Ser. No. 11/262,660, the subject matter of which is also hereby incorporated herein by reference in its entirety.

Because of the small size of such re-terminable connectors, it is often difficult to terminate such connectors in the field. Moreover, it was possible in prior designs for the connector to become accidentally de-activated during use.

SUMMARY

There is a need for a re-terminable fiber-optic connector assembly that can readily and positively terminate a re-terminable fiber stub connectors in the field.

Advantageous features are a re-terminable fiber optic connector assembly having an internal cam mechanism that can terminate the fiber stub through relative rotation of at least one part of the connector assembly relative to another. The activation may be achieved using a hand-held cam activation tool, or used in conjunction with a connector support structure to provide simplified and expeditious field termination of fiber optic cables.

In exemplary embodiments, the re-terminable connector is an ST-type connector.

In accordance with other aspects of the invention, the connector includes a housing, such as a bayonet, matable to a mating adapter, a backbone retained within a rear of the housing, a ferrule holder provided within the backbone, and a cam provided between the ferrule holder and the backbone. Preferably, the ferrule holder includes an alignment key exposed to mate with a cam activation tool to lock rotation of the ferrule holder relative to other connector components.

In an exemplary embodiment, the cam includes a cam activation cutout at a front face thereof that mates with a cam activation tool interface to enable rotation of the cam between de-activated and activated positions, the cam activation cutout also receiving the alignment key of the ferrule holder therethrough. The cam further includes a first camming profile that actuates a field fiber clamp and a second camming profile that actuates a buffer clamp.

In accordance with other aspects of the invention, the connector may further include alignment flats and features for preventing rotation and axial movement of various components.

In accordance with yet additional aspects, because the cam is unexposed when mated, inadvertent de-activation can be prevented.

Other features and advantages will be recognized when read in light of the following disclosure.

BRIEF DESCRIPTION OF THE DRAWINGS

Various exemplary embodiments will be described in detail, with reference to the following figures, wherein:

FIGS. 31-33 show perspective views of cam activation tool assembly, in which FIG. 31 shows cam activation tool 2 approaching base 1, FIG. 32 shows a front view of cam activation tool 2 installed onto base 1, and FIG. 33 shows a rear view of cam activation tool installed onto base 1;

FIG. 43 shows a perspective view of an exemplary fiber optic connector of the ST-type with the bayonet of FIG. 41 and a strain relief boot;

FIG. 44 shows a perspective view of an backbone assembly of the fiber optic connector of FIG. 43 with the bayonet and a compression spring removed for clarity; and FIG. 45 shows a partial perspective view of the fiber optic connector and bayonet of FIG. 43 being slid into engagement with an exemplary ST-type receptacle.

DETAILED DESCRIPTION OF EMBODIMENTS

Figure 1:
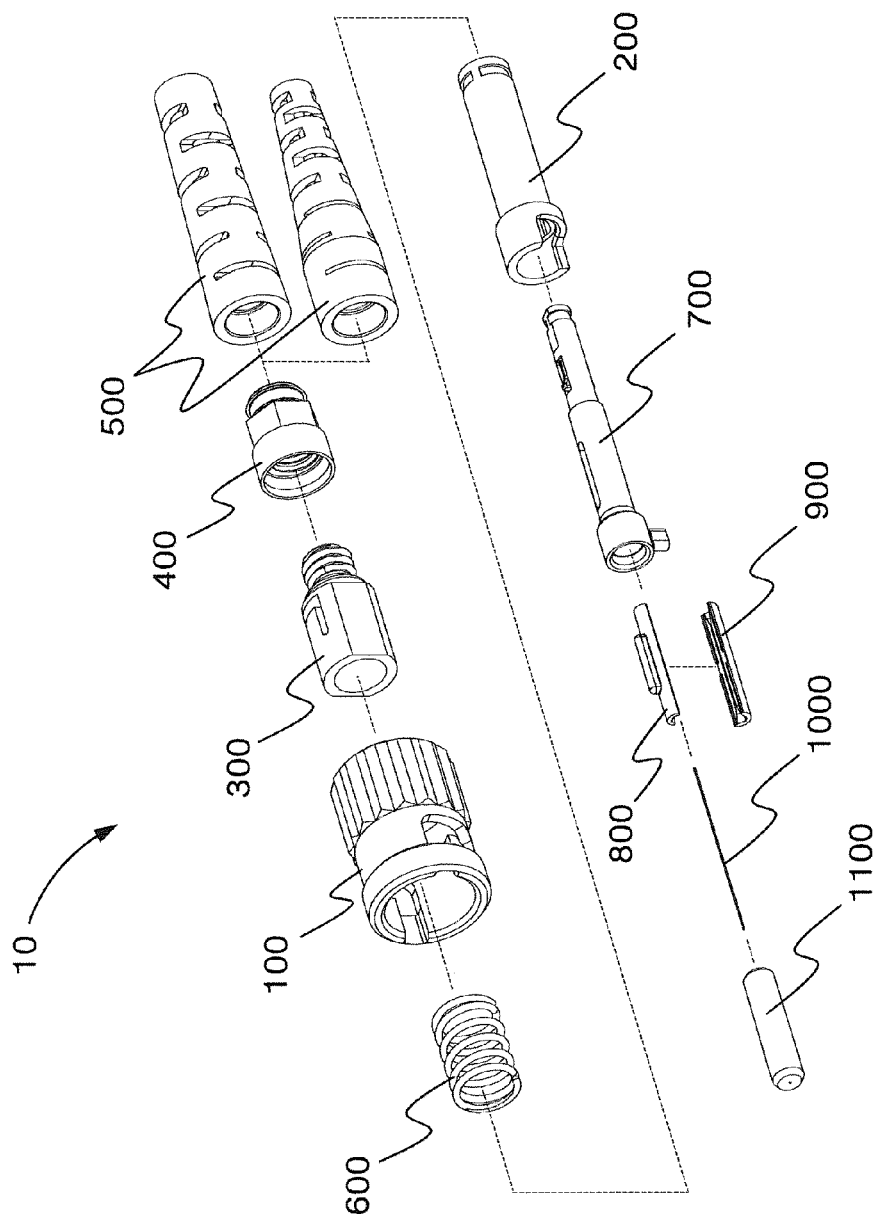
FIG. 1 shows an exploded view of an exemplary pre-polished no crimp fiber optic connector.
Figure 2:
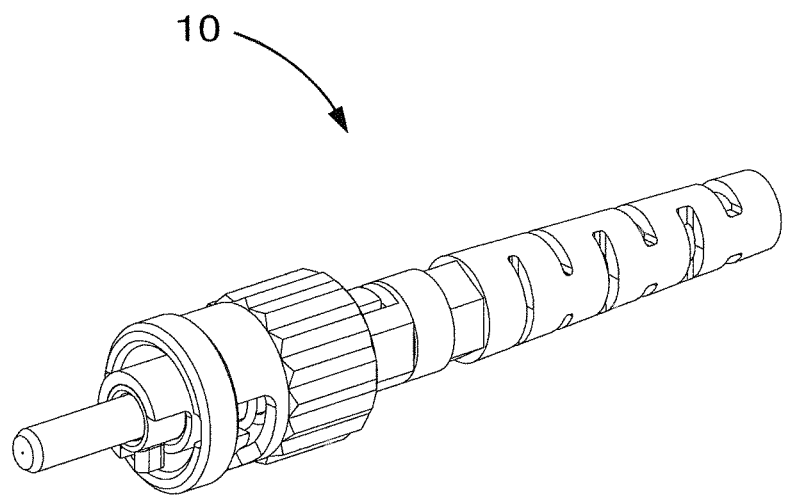
FIG. 2 shows an assembled perspective view of the fiber optic connector of FIG. 1.
Figure 3:
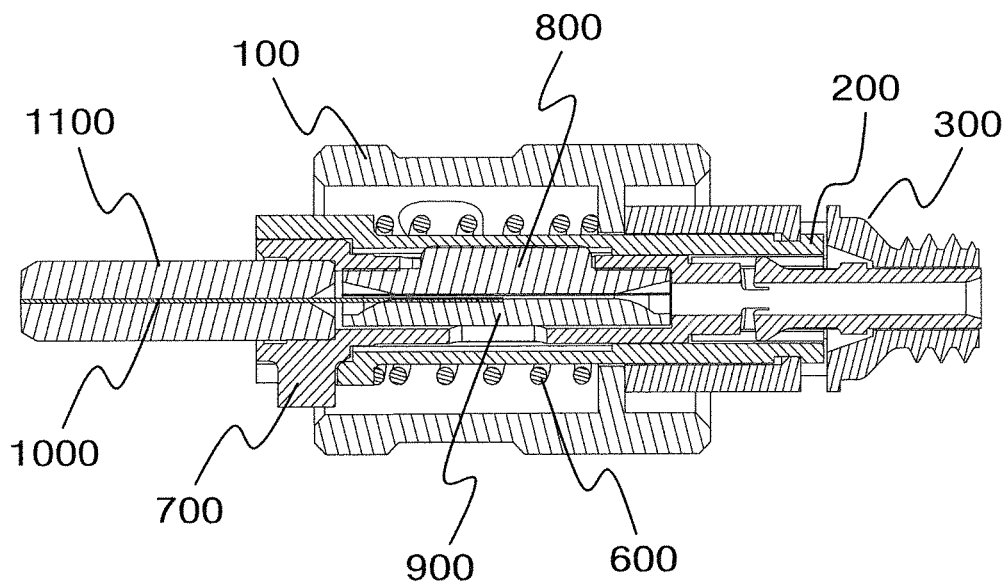
FIG. 3 shows a cross-sectional view of the optical connector of FIG. 2 taken along the centerline (with the strain relief boot omitted)

FIGS. 1-3 show an exemplary re-terminable fiber optic connector 10 in exploded, assembled and cross-sectional views. Connector 10 includes a bayonet 100, cam 200, backbone 300, retaining nut 400, strain relief boots 500, compression spring 600, ferrule holder 700, cam plank 800, Vee-plank 900, optical fiber stub 1000, and ferrule 1100. Connector 10 is designed to be terminated, for example, using either buffered optical fiber or jacketed optical fiber cable with an aramid fiber strength member. This particular exemplary optical connector is a no-crimp design in which rotation of cam 200 is used to activate or deactivate termination of the fiber in the connector. Rotation is preferably achieved using a cam activation tool, an example of which will be described later with reference to FIGS. 27-40.

Bayonet 100 provides a gripping surface for users while also retaining backbone 300 and spring 600. Bayonet 100 latches to a mating adapter (unshown) as known in the art. Cam 200 retains spring 600 and provides a cam surface for cam plank 800 that urges cam plank 800 toward and away from Vee-plank 900 to terminate or release optical fiber stub 1000 and an optical fiber end therebetween. Cam 200 also may include an interface surface for mating with an activation tool.

Backbone 300 retains bayonet 100 and is threadably connectable to retaining nut 400 to retain an aramid strength member from jacketed fiber optic cabling therebetween as known in the art. Backbone 300 preferably includes snap features to retain both cam 200 and ferrule holder 700. A front end of retaining nut 400 includes threads that mate with backbone 300. A rear end of retaining nut 400 retains a suitable strain relief boot 500. Strain relief boot 500 provides strain relief and minimum bend radius control to the optical fiber received within connector 10. Compression spring 600 provides axial force to mated ferrule 1100 end faces during a mating condition.

Ferrule holder 700 serves several functions. Ferule holder 700 retains cam plank 800 and Vee-plank 900 therein so that when terminated, cam plank 800 and Vee-plank 900 are urged together to clamp and retain optical fiber stub 1000 and a length of optical fiber therebetween. Ferrule holder 700 also provides keyed positioning relative to an adapter and serves to align the ferrule 1100 within the ferrule holder 700. Additionally, ferrule holder 700 serves as a bearing surface for rotation of cam 200.

The optical fiber stub 1000 guides light and serves as an interface with a mating fiber optic element when suitably abutted. Ferrule 1100 is provided to align the optical fiber stub 1000 as known in the art.

Figure 4:
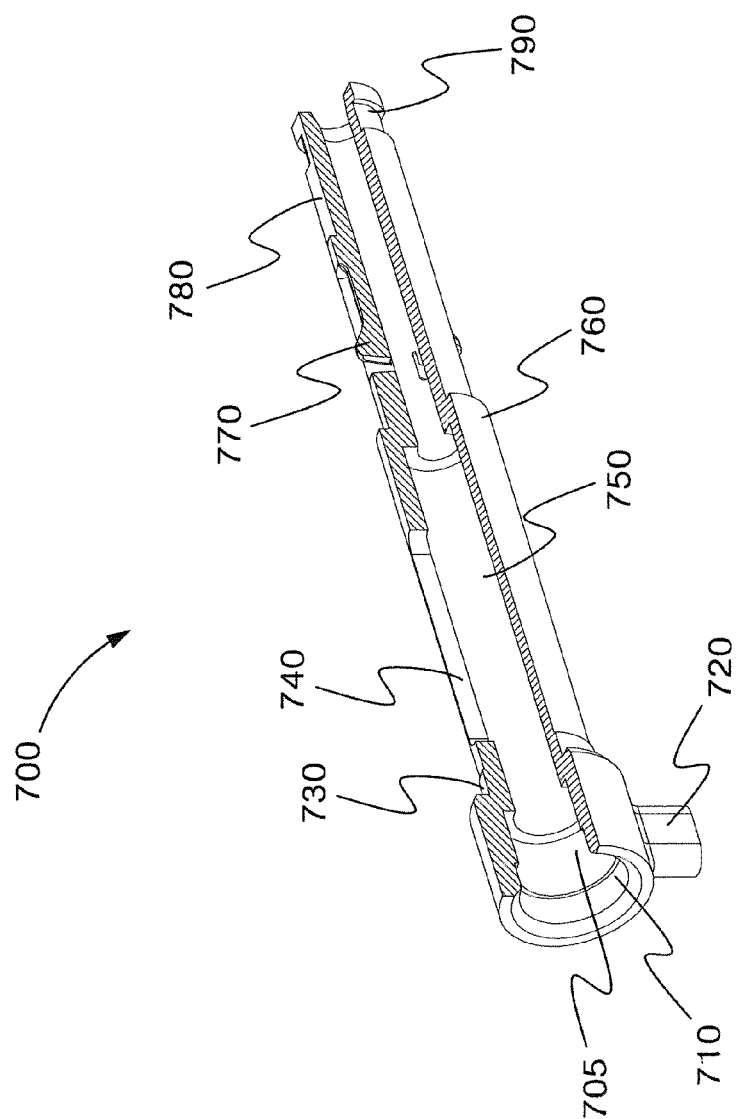
FIG. 4 shows a perspective partial cross-sectional view of a ferule holder in the optical connector of FIG. 1.

Various sub-components of the exemplary optical connector 10 will be described with reference to FIGS. 4-17. FIG. 4 shows details of ferrule holder 700. Ferrule holder 700 includes a ferrule alignment pocket 705 on a first end that aligns and fixes ferrule 1100. An adhesive pocket 710 receives adhesive for bonding of the ferrule 1100 to the ferrule holder 700. An alignment key 720 extends radially outward from ferrule holder 700 near the one end and provides a radial alignment element relative to a mating adapter. A forward bearing surface 730 is provided near the first end that provides a first bearing surface for cam 200. A rear bearing surface 760 is provided rearward of forward bearing surface 730 that provides an additional bearing surface for cam 200. The bearing surfaces minimize radial misalignment of the cam.

Figure 11:
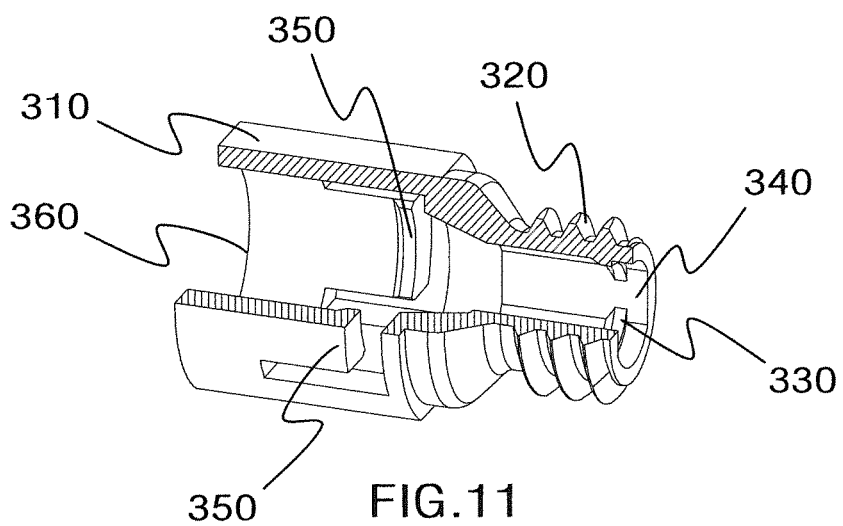
FIG. 11 shows a backside perspective partial cross-sectional view of the backbone of FIG. 10.

A rib slot 740 is provided intermediate ends of ferrule holder 700 for positioning and retaining a cam plank rib provided on cam plank 800 while cam plank 800 and Vee-plank 900 are movably retained within a plank pocket 750. A buffer clamp 770 includes a lever arm that is biased to extend slightly above the outer circumference of ferrule holder 700 to retain a fiber buffer. An alignment flat 780 is provided on a portion of the ferrule holder circumference near an opposite second end of the ferrule holder. Alignment flat 780 prevents axial rotation of ferrule holder 700 relative to backbone 300. Alignment flat 780 mates parallel with a backbone alignment flat 340 (FIG. 11). An annular snap groove 790 is provided near the second end that axially retains and positions the ferrule holder 700 to backbone 300 by retention of backbone annular snap 330 (FIG. 11).

In prior designs, the alignment key was located on the cam. Because of this, it was possible that the connector cam could be de-activated when the connector was mated into an adapter because the backbone was free to rotate. Thus, if an end user held onto and rotated the backbone, the cam would de-activate. However, this exemplary design prevents cam de-activation when the connector is mated to an adapter. This is achieved by locating the alignment key 720 on the ferrule holder 700 rather than the cam. The ferrule holder 700 is prevented from rotating because the alignment key 720 engages in an adapter slot. Moreover, the backbone 300 and the ferrule holder 700 are fixed relative to each other by backbone alignment flat 340 and ferrule holder alignment flat 780. Because the ferrule holder 700 prevents backbone 300 from rotating and the cam 200 is unexposed, cam 200 cannot be de-activated when mating with an adapter. That is, because no part of cam 200 is exposed when connector 10 is mated in the adapter, it is not possible to rotate the cam relative to the other parts. This ensures positive activation of the cam.

FIGS. 5-8 show details of cam 200. Cam 200 is provided with an activation cutout 210 that interfaces with a cam activation tool to be described later. Activation cutout 210 also provides clearance for the ferrule holder alignment key 720 during cam activation. Cam activation cutout 210 allows for limited rotation of ferrule holder 700 (such as 90°). In particular, cutout 210 limits motion of alignment key 720. The cutout 210 also serves as an interface between cam 200, ferrule holder 700, and a cam activation tool. A forward bearing surface 220 and rear bearing surface 240 provide bearing surfaces for ferrule holder 700. This minimizes radial misalignment of ferrule holder 700.

Figure 7:
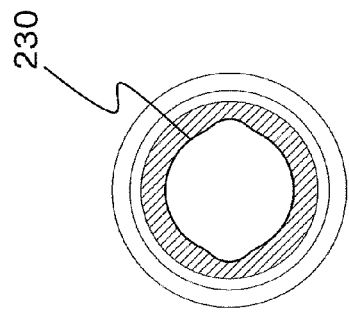
FIG. 7 shows a cross-sectional view of the cam of FIG. 6 taken along lines 7-7.
Figure 8:
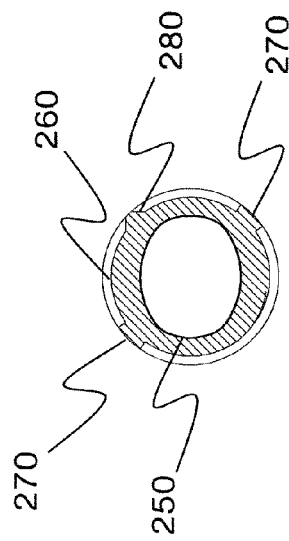
FIG. 8 shows a cross-sectional view of the cam of FIG. 6 taken along lines 8-8.
Figure 5:
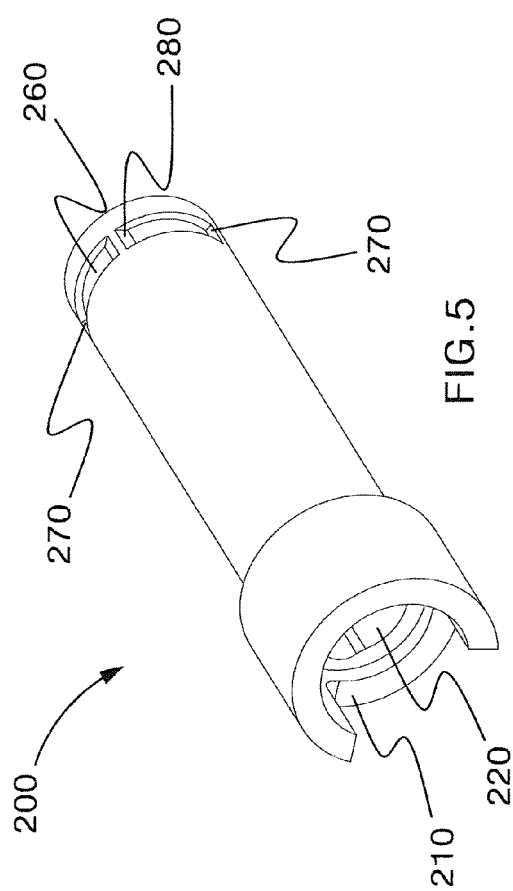
FIG. 5 shows a perspective view of an exemplary cam of the optical connector of FIG. 1.
Figure 6:
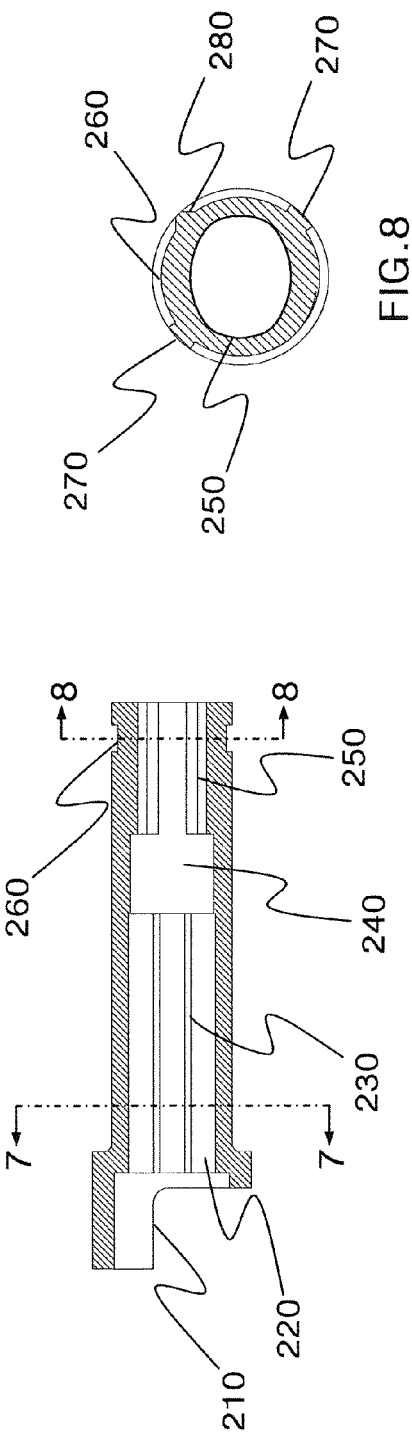
FIG. 6 shows a cross-sectional view of the cam of FIG. 5 taken along the centerline.
Figure 13:
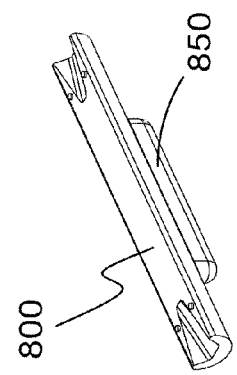
FIG. 13 shows a perspective view of an exemplary cam plank of the optical connector of FIG. 1.

The interior of cam 200 includes a plank cam profile 230 as best shown in FIGS. 6-7 near a first end of cam 200. Cam profile 230 provides a camming surface for the cam plank rib 850 (FIG. 13). A buffer clamp cam profile 250 is provided near an opposite second end of cam 200 and provides a camming surface for buffer clamp 770 (FIG. 4).

An annular snap groove 260 axially positions and retains backbone 300, by retaining backbone cantilever snap 350 (FIG. 11). The second end also includes detent stops 270 and detent ramp 280. Detent stops 270 limit rotation of cam 200 during cam rotation while detent ramp 280 limits rotation of cam 200 during normal connector use and allows rotation of cam 200 during cam activation. The detent features thus allow retention of cam 200 within backbone 300 while also having a built-in stop feature of a suitable limit, such as 90°.

Figure 9:
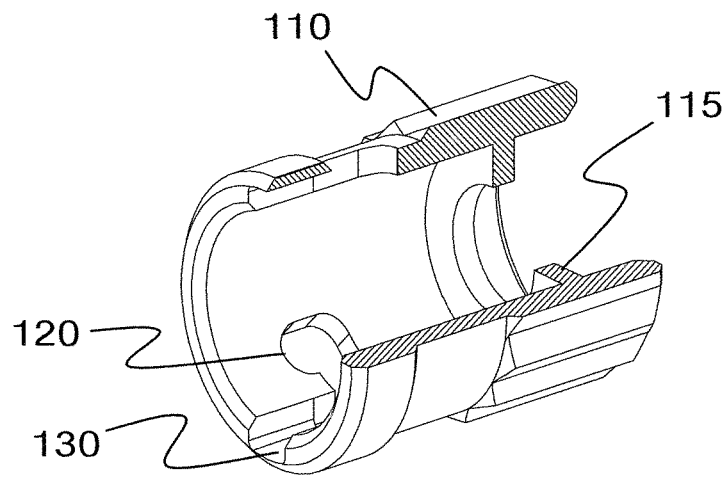
FIG. 9 shows a perspective partial cross-sectional view of an exemplary bayonet of the optical connector of FIG. 1.

FIG. 9 shows a perspective partial cross-sectional view of an exemplary bayonet 100. Bayonet 100 includes a grip region 110 formed from knurled or ribbed elements extending around a portion of the periphery of bayonet 110. A retaining flange 120 is provided on the interior of bayonet 100 and retains the backbone 300 and spring 600. A latch 130 secures the connector to an adapter by latching to adapter pins as known in the art. Latch areas may be bridged to provide additional retention strength to the latches when mated to an adapter.

Figure 10:
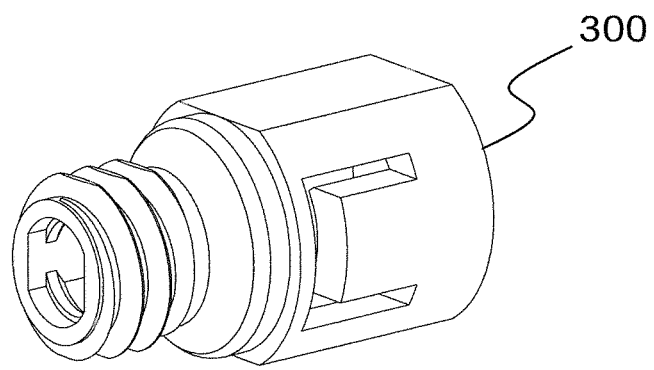
FIG. 10 shows a perspective view of an exemplary backbone of the optical connector of FIG. 1.

FIGS. 10-11 show details of an exemplary backbone 300. Backbone 300 includes anti-rotation flat 310, which prevents axial rotation of backbone 300 during cam activation by locking elements 300 and 700 in the same rotation. Threads 320 are provided on one end of backbone 300 and mate with retaining nut 400. An aramid strength member may be retained between the nut and backbone when the nut 400 is threaded onto the backbone. An annular snap 330 axially retains and positions ferrule holder 700 relative to backbone 300 and is seated in annular snap groove 790 of ferrule holder 700 (FIG. 4). Alignment flat 340 prevents axial rotation of backbone 300 relative to ferrule holder 700 and mates with alignment flat 780 of ferrule holder 700. Cantilever snaps 350 axially retain and position cam 200 relative to backbone 300 and provides a detent surface that limits cam rotation. Bayonet bearing surface 360 provides axial positioning of bayonet 100.

Figure 12:
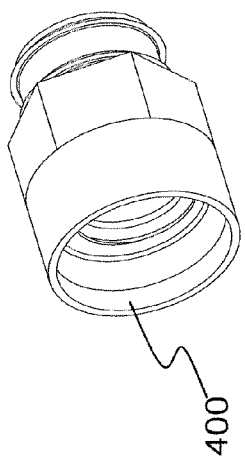
FIG. 12 shows a perspective view of an exemplary retaining nut of the optical connector of FIG. 1.
Figure 15:
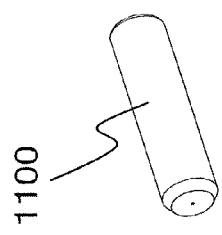
FIG. 15 shows a perspective view of an exemplary ferrule of the optical connector of FIG. 1.
Figure 14:
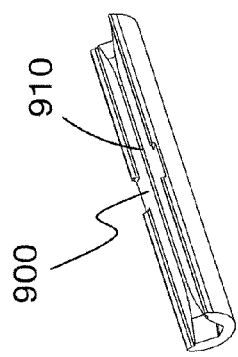
FIG. 14 shows a perspective view of an exemplary Vee-plank of the optical connector of FIG. 1.
Figure 17:
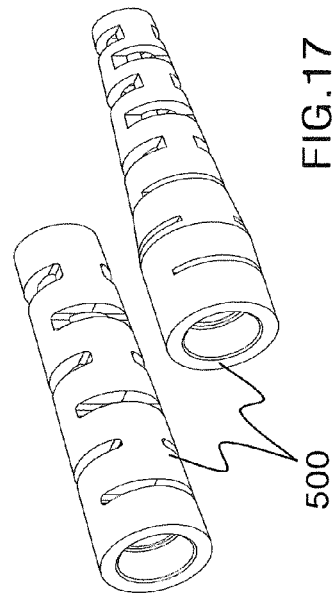
FIG. 17 shows exemplary strain relief boots of the optical connector of FIG. 1.
Figure 16:
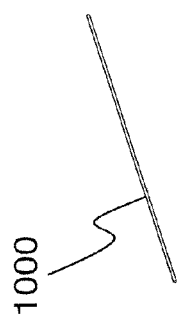
FIG. 16 shows an exemplary optical fiber stub of the optical connector of FIG. 1.

FIG. 12 shows details of an exemplary retaining nut 400. FIG. 13 shows details of an exemplary cam plank 800, which includes a protruding rib 850. FIG. 14 shows details of an exemplary Vee-plank 900, which includes a central slot sized to receive optical fiber stub 1000 therein. FIG. 15 shows details of an exemplary ferrule 1100. A suitable ferrule is the shown industry standard 2.5 mm diameter ferrule 1100. FIG. 16 shows an exemplary optical fiber stub 1000, a conventional short length of bare optical fiber. FIG. 17 shows two different styles of strain relief boots, which provide both strain relief and bend radius control for the optical cable exiting the connector.

Figure 18:
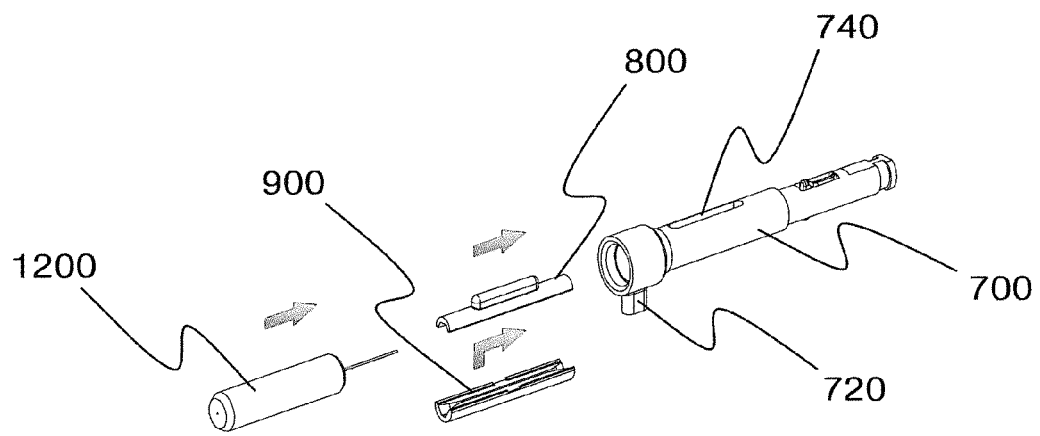
FIG. 18 shows an exploded perspective view of a ferrule holder sub-assembly of the optical connector of FIG. 1 prior to assembly.
Figure 19:
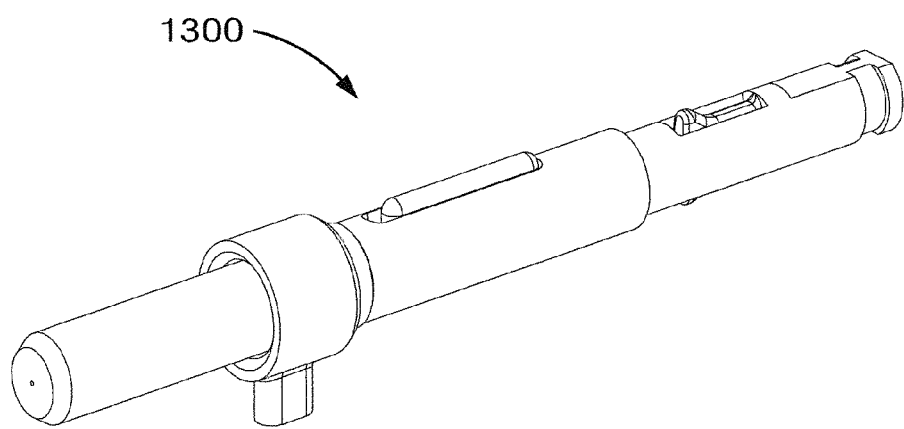
FIG. 19 shows a perspective view of the ferrule holder sub-assembly of FIG. 18 in an assembled state.

The components of optical connector 10 are assembled into various sub-assemblies. FIGS. 18-19 show a fiber stub sub-assembly 1200 consisting of optical fiber stub 1000 and ferrule 1100 in an assembled state. A ferrule holder sub-assembly 1300 consists of cam plank 800, Vee-plank 900, ferrule holder 700, and fiber stub sub-assembly 1200. These parts are assembled as shown. In particular, cam plank 800 is inserted into ferrule holder 700 until cam plank rib 850 protrudes through slot 740 in ferrule holder 700. The Vee-plank 900 is then inserted into ferrule holder 700 such that the flat faces of both planks 800, 900 are facing each other. The ferrule stub sub-assembly 1200 is then attached to ferrule holder 700 through interference fit and/or adhesive as known in the art. In particular, the ferrule stub sub-assembly 1200 is pressed into pocket 710 of ferrule holder 700. A suitable adhesive may be applied and allowed to cure in pocket 720 around ferrule 1100 for additional retention force. Adhesive may also be applied around ferrule 1100 before or during the press operation. This results in the assembled components shown in FIG. 19.

Figure 20:
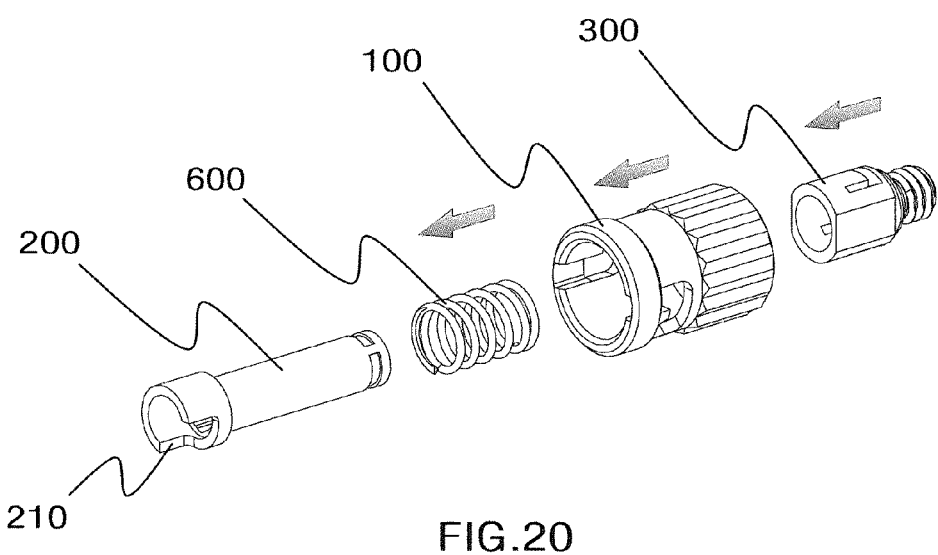
FIG. 20 shows an exploded perspective view of a cam sub-assembly of the optical connector of FIG. 1 prior to assembly.
Figure 21:
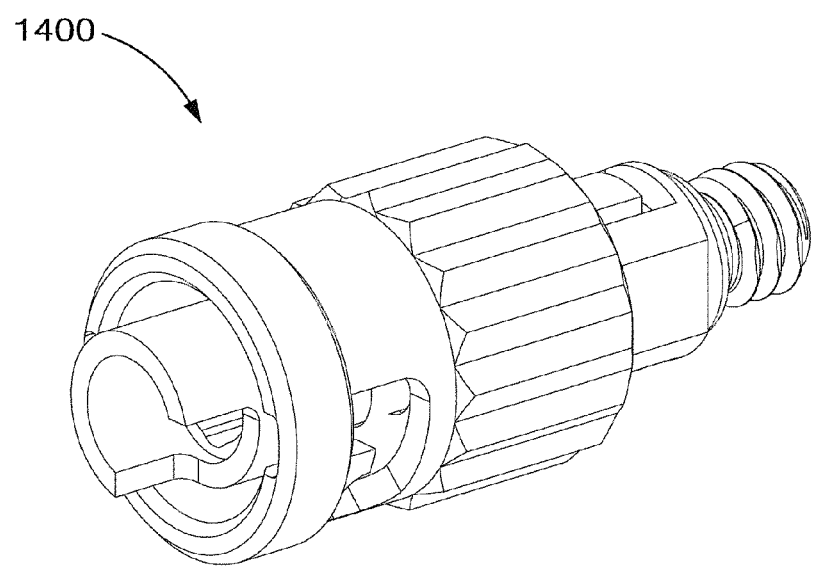
FIG. 21 shows a perspective view of the cam sub-assembly of FIG. 20 in an assembled state.

FIGS. 20-21 show a cam sub-assembly 1400 consisting of cam 200, compression spring 600, bayonet 100, and backbone 300. Compression spring 600 and bayonet 100 are captured between cam 200 and backbone 300. Cam 200 and backbone 300 are axially fixed relative to each other by suitable connection, such as snap fit. An exemplary connection method involves placing compression spring 6 over the smaller cylindrical surface of cam 200. Radial alignment between compression spring 600 and cam 200 is not necessary at this time. Bayonet 100 is then placed onto cam 200 such that the bayonet grips 110 are positioned axially opposite the cam activation cutout 210. Radial alignment between bayonet 100 and cam 200 is not required at this time. Backbone 300 is then aligned with cam 200 such that the backbone threads 320 are positioned axially opposite cam activation cutout 210 and the backbone cantilever snap 350 is radially aligned between cam detent stop 270 and detent ramp 280. The backbone 300 is then pushed axially toward cam activation cutout 210 until the backbone cantilever snap 350 is positioned in the cam annular snap groove 260. This results in preloading of compression spring 600 between cam 200 and bayonet 100 and an assembly as shown in FIG. 21.

Figure 22:
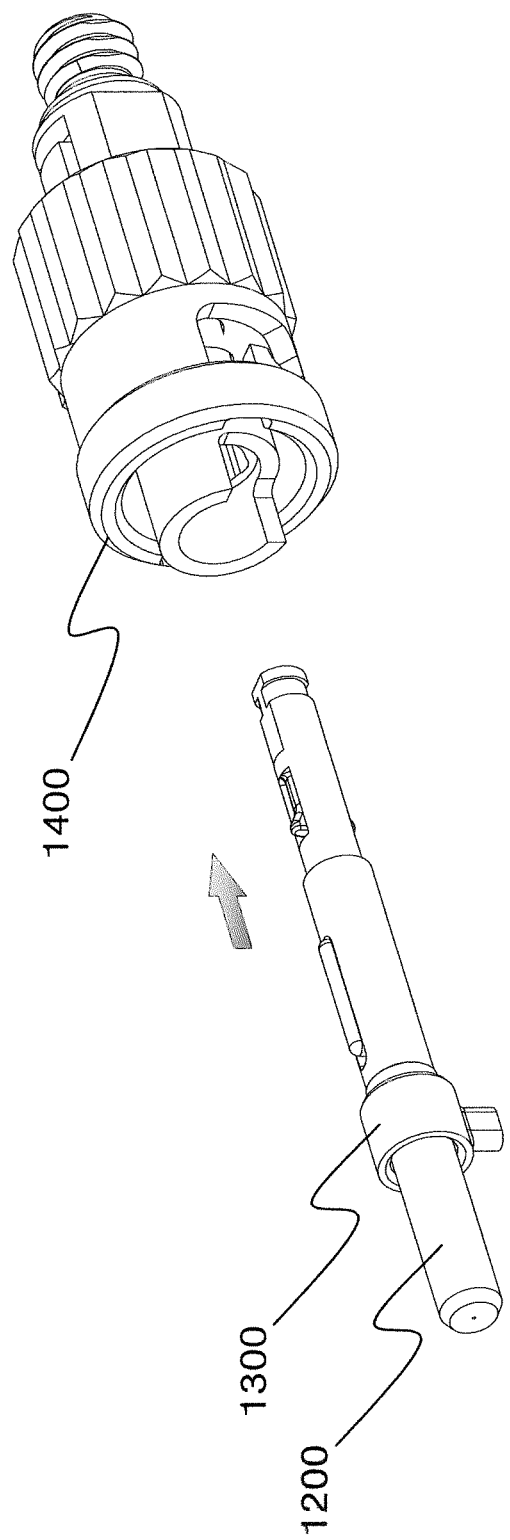
FIG. 22 shows an exploded perspective view of the assembled ferrule holder sub-assembly and cam sub-assembly.
Figure 23:
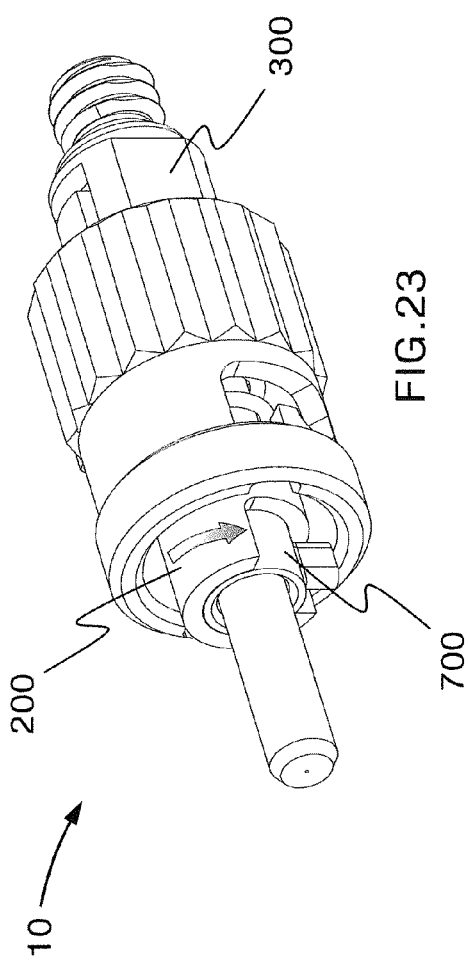
FIG. 23 shows a perspective view of the sub-assemblies of FIG. 22 once assembled.

Final assembly of connector 10 is shown in FIGS. 22-23. Ferrule holder sub-assembly 1300 is axially and radially aligned with cam 200 of cam sub-assembly 1400 such that the cam plank rib aligns with one of the two offset cylindrical surfaces on the cam plank cam profile. The ferrule holder sub-assembly 1300 and cam sub-assembly 1400 are then relatively fixed to each other when backbone 300 snap 330 locks into the ferrule holder annular snap groove 790.

A small amount of optical index matching gel may then be injected into the ferrule holder assembly to fill the space between planks 800, 900 and eliminate an air gap between the field and stub fibers. Alternatively, the gel can be added after the planks are installed in the holder. Connector 10 is now ready for final termination and consists of the connector assembly shown in FIG. 23, which upon termination will further include retaining nut and a strain relief boot.

A particular advantage to the illustrated connector design is that the ferrule holder 700 is isolated from axial loads on the optical fiber cable when the cable is mated in a suitable adapter. In this particular example of an ST-type fiber optic connector, the adapter may be a FOCIS-2 (ST-type) adapter. This is desirable because the ferrule holder 700 may experience high tensile stresses due to the small cross-section at the buffer clamp area 770. These axial loads are transmitted from backbone 300 to cam 200 by cantilever snap 350 and annular snap groove 260, from cam 200 to compression spring 600, from the compression spring 600 to bayonet flange 120, from bayonet flange 120 to bayonet latch 130, and finally to the adapter (unshown).

Figure 26:
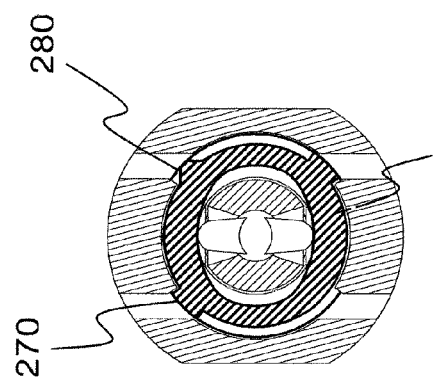
FIG. 26 shows a cross-sectional view of the internal cam of the optical connector in a fully activated position.

Connector 10 is now ready for end user termination in field and is positionable between a deactivated position (FIG. 24), through a partially activated position (FIG. 25), and a fully activated position (FIG. 26). As can be seen in these Figures, buffer clamps 770 move from the expanded and separated state of FIG. 24 to a compressed state in FIG. 26 that biases a buffer of an optical fiber therebetween to effect termination. At this time, planks 800, 900 are urged towards each other to bias and hold stub 1100 and an end section of optical fiber, with the fiber clamping first and the buffer generally clamping after the fiber is clamped.

One exemplary method of termination of the connector will now be described. Connector 10 is positioned in a cam activation tool, such as the one described in FIGS. 27-40 below. A length of jacketed optical fiber cable or buffered fiber is then suitably stripped to expose a short length of bare optical fiber followed by a short length of buffered fiber as is known. The fiber is then cleaved using any conventional cleaving device to provide an end face that is near perpendicular to the axis of the fiber. The cleaved fiber is then inserted into the back opening of ferrule holder 700. Cam plank 800 and Vee-plank 900 are initially spaced apart and guide the fiber into the groove of Vee-plank 900 as the fiber is pushed toward ferrule 1100. Eventually, the fiber butts against the end of optical fiber stub 1000 and the buffer is positioned between ferrule holder 700 and ferrule holder buffer clamps 770. Ferrule holder 700 and backbone 300 are then held in a fixed position while cam 200 is rotated by 90° counter-clockwise relative to ferrule holder 700 as shown in FIG. 23. Connector 10 is then positioned in a cam activation tool, such as the one described in FIGS. 27-40 below.

In particular, connector 10 is seated in the tool so that backbone anti-rotation flats 310 are positioned in a slot on the tool that hold the backbone in a fixed position. A tool feature that engages the cam activation cutout is rotated 90° counter-clockwise to activate the connector cam mechanism.

The two cam surfaces 230 and 250 are timed so that plank cam profile 230 engages and clamps the fibers generally before the buffer clamp cam profile 250 engages and clamps the buffer. As cam 200 is rotated, cam plank profile 230 pushes against the cam plank rib 850. The cam plank 800 pushes against the Vee-plank 900, which is supported inside ferrule holder 700. The optical fiber stub and field fiber are clamped between the cam plank 800 and Vee-plank 900. Shortly after the cam plank profile 230 engages the cam plank 800 and the cam buffer clamp cam profile 250 forces the buffer clamps 770 on the ferrule holder 700 towards each other to capture the fiber buffer.

Figure 25:
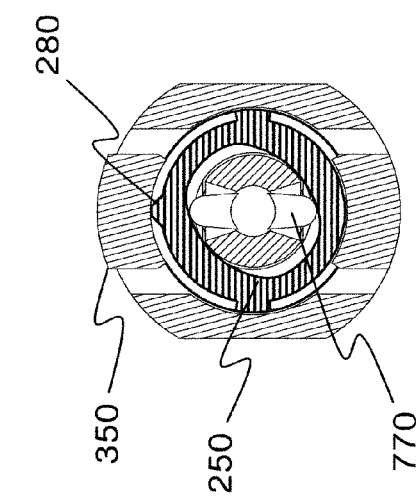
FIG. 25 shows a cross-sectional view of the internal cam of the optical connector in a partially activated position.
Figure 24:
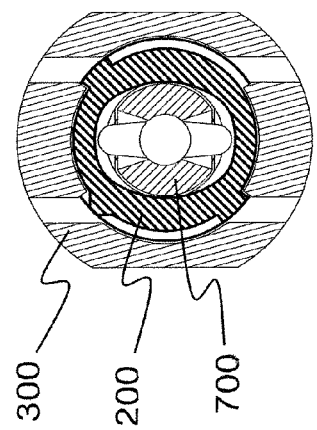
FIG. 24 shows a cross-sectional view of the internal cam of the optical connector in a non-activated position.
Figure 27:
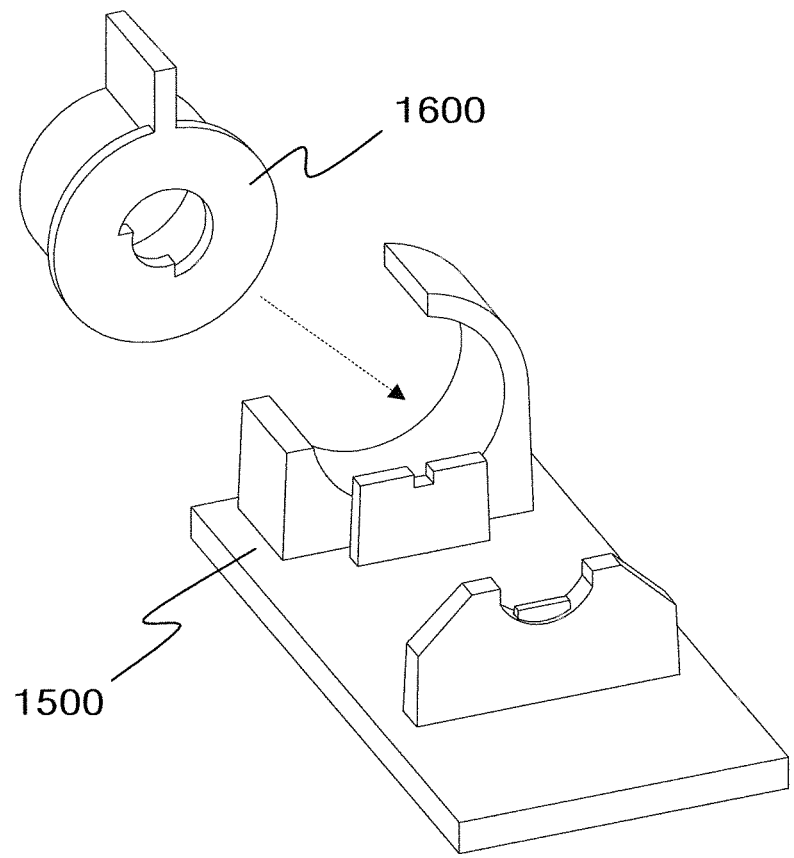
FIG. 27 shows an exploded perspective view of a cam activation tool base 1 and cam activation tool 2 according to an exemplary embodiment.

One backbone cantilever snap 350 deflects as it slides over cam detent ramp 770 and abuts cam detent stop 280 (FIGS. 24-26) to prevent further rotation of cam 200. The cam detent stop 280 provides a positive stop to ensure proper cam engagement. The cam detent ramp 270 prevents accidental disengagement of cam 200 during use. The process is reversible when sufficient force is applied in a clockwise direction such that backbone cantilever snap 350 deflects and slides over cam detent ramp 270. FIG. 24 shows a de-activated cam. FIG. 25 shows the cam at mid-activation. FIG. 26 shows a fully activated cam.

Strain relief boots 500 are used to provide strain relief and control of the bend radius of the optical fiber. A strain relief boot used for buffered fiber is attached by an interference fit between the boot and the backbone threads 320. A strain relief boot used for jacketed optical fiber cable is attached by an interference fit between the boot 500 and the retaining nut 400 that has been threaded onto the backbone threads 320.

In the illustrated embodiment, connector 10 is an ST-type connector. However, the invention is not limited to this and may take other forms of no-crimp fiber optic connector.

An exemplary cam activation tool 20 for use in terminating connector 10 will be described with reference to FIGS. 27-33. Tool 20 mates with fiber optic connector 10 and rotates to activate a cam mechanism, such as cam 200, of the connector through a grip portion, such as a lever, to terminate a fiber without a crimp. Tool 20 thus allows the connector termination to be reversed.

Tool 20 includes a base 1500 and a cam activation tool handle 1600. Tool base 1500 is provided to position and support connector 10 and cam activation tool handle 1500. The tool engages with the connector ferrule holder to prevent rotation and engages with the connector backbone to prevent rotation. The cam activation tool handle 1600 then engages with the connector, rotates the connector cam, and provides a gripping surface for improved handling of the tool.

Figure 28:
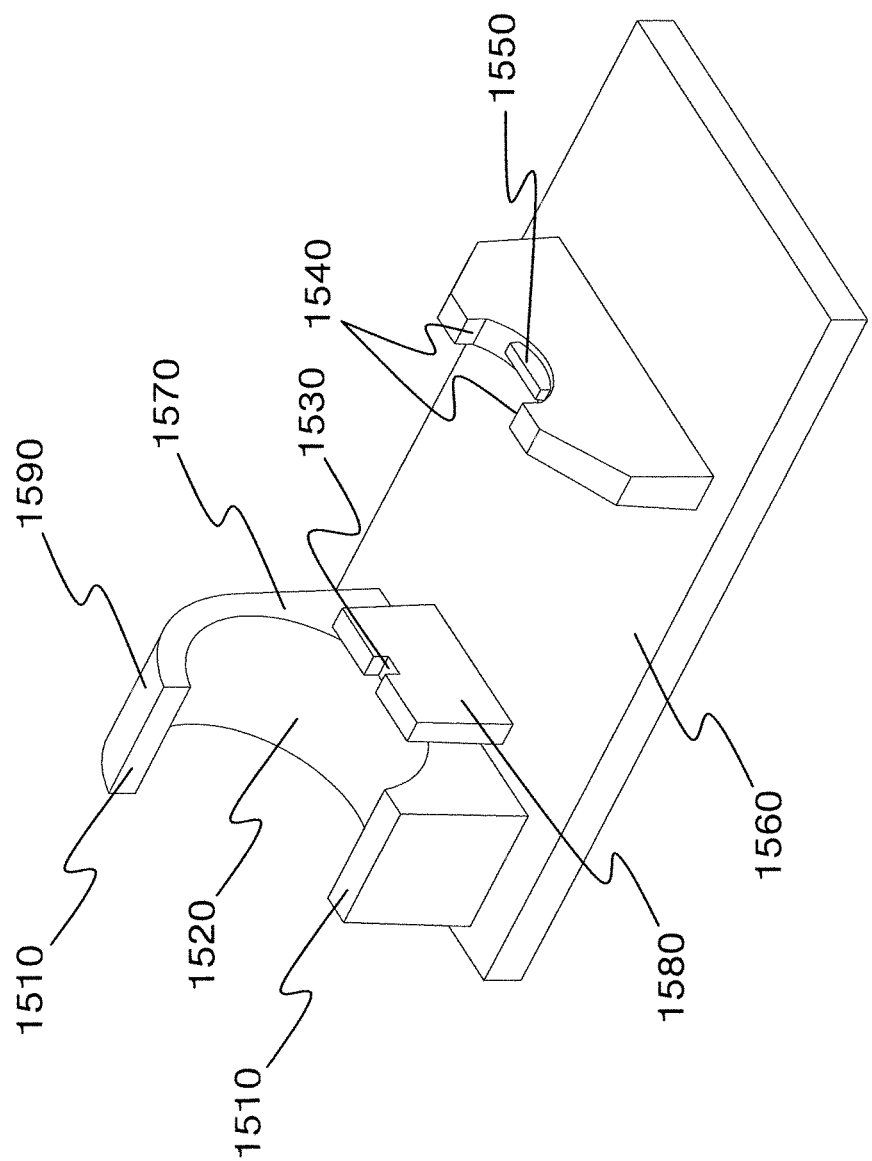
FIG. 28 shows a perspective view of the cam activation tool base 1 of FIG. 27.
Figure 40:
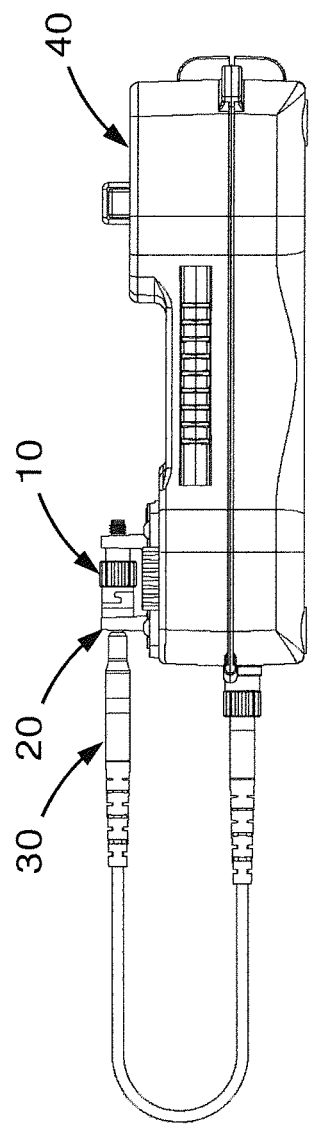
FIG. 40 shows the installed re-terminable fiber optic connector in the cam activation tool as part of an Opti-Cam termination tool.

Specific details of an exemplary base 1500 are shown in FIG. 28. Base 1500 includes a base plate 1560, a tool handle retaining arm and two upstanding cradle members. Base plate 1560 may be mounted on a suitable support surface, or form part of another tool, such as an Opti-Cam termination tool 40 (FIG. 40). The retainer arm 1590 is arcuate and defines a semi-cylindrical bearing surface 1520 and rotation stops 1510. Because tool 20 is made from a plastic or other partially resilient material, there is an amount of bending that allows for insertion of handle 1600 into the bearing surface 1520. This allows for a snap-fit connection of handle 1600 through the opening defined by rotation stops 1510 and rotatable retention within bearing surface 1520 delimited by stops 1510. Bearing surface 1520 interfaces with an outer circumference of tool handle 1600 and minimizes axial misalignment of the tool relative to the base. A rear surface of the retaining arm forms an alignment face that axially positions the cam activation tool handle 1600 during use.

A first upstanding member forms an alignment pad 1580 that is positioned slightly rearward of the retaining arm 1590. Alignment pad 1580 includes an anti-rotation slot 1530 on a top surface thereof that engages with the connector ferrule holder alignment key 730 to support or cradle the ferrule holder and prevent rotation of the ferrule holder 700 during cam activation.

A second upstanding member forms a cradle or support for a rear end of connector 10 and includes anti-rotation flats 1540 and a guide post 1550. Anti-rotation flats 1540 align the connector backbone 300 and prevent backbone 300 from rotating during cam activation. In particular, flats 1540 mate with corresponding flats 310 on backbone 300. Guide post 1550 also engages with backbone 300 and prevents axial movement. This is achieved, for example, by guide post 1550 mating into slot 350 of backbone 300.

Figure 30:
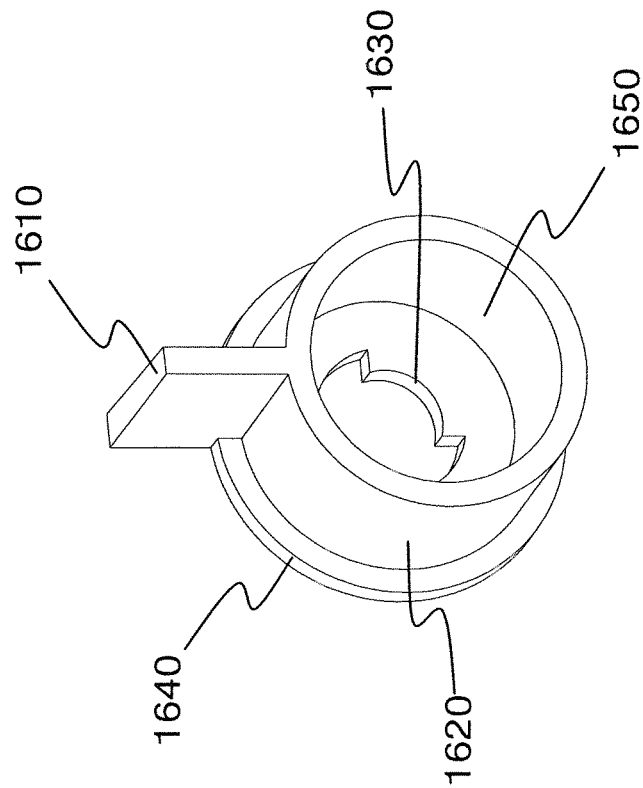
FIGS. 29-30 show front and rear perspective views of the cam activation tool 2 of FIG. 27.
Figure 29:
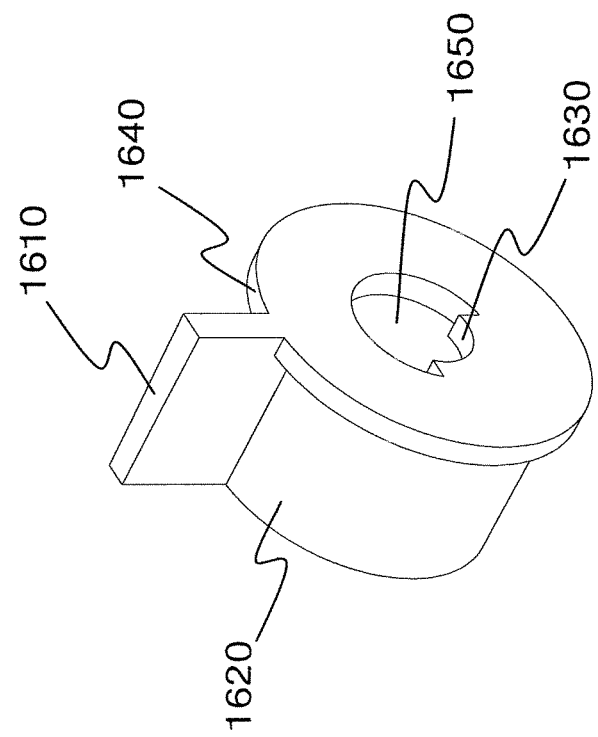

Details of an exemplary cam activation tool handle 1600 are shown in FIGS. 29-30. Handle 1600 includes a circular shape that defines an outer bearing surface 1620 and an inner through hole 1650. A grip portion 1610 serves as a gripping surface for activation (rotation) of the cam tool handle by an end user. An exemplary grip is lever 1610, which extends radially outward from the handle. Because of the relatively small size of the tool and connectors being terminated, such as about a 7/16" diameter base and a lever 1610 height of about ¼", the lever is particularly useful in providing sufficient height and leverage to effect rotation of the tool handle and activation of the connector cam. An alignment flange 1640 is provided on one side of the tool handle. Flange 1640 extends radially beyond the outer circumference of the tool handle bearing surface 1620 and serves to prevent axial movement of the cam activation tool 1600 during use by closely fitting between base alignment face 1170 and alignment pad 1180. Through hole 1650 provides clearance for receipt of portions of connector ferrule 1100 therethrough and clearance for a patch cord, such as a VFL patch cord 30 (FIG. 40). Through hole 1650 includes a cam interface 1630 that interfaces and mates with connector cam 200 to provide a structure that enables activation and de-activation of the cam 200 by having a profile that matches that of cam 200 so that the two elements rotate together.

Figure 33:
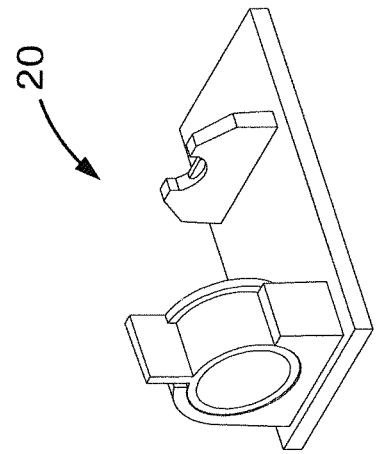
Figure 32:
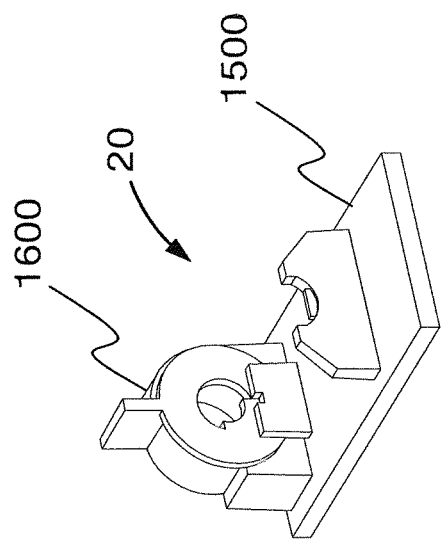
Figure 31:
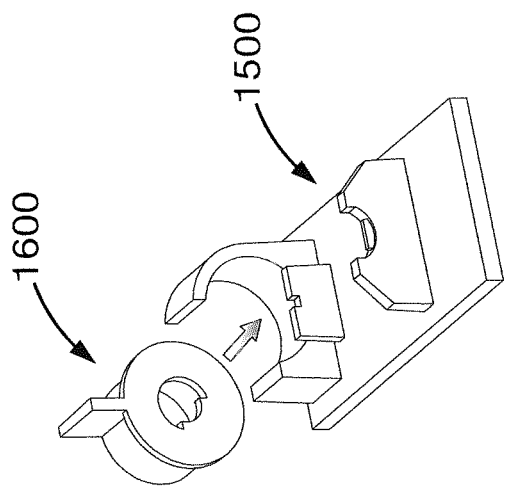

Cam activation tool 20 is assembled as shown in FIGS. 31-33. First, cam activation tool handle 1600 is placed near retaining arm 1590. Alignment 1640 is then axially aligned between base alignment face 1570 and alignment pad 1580. Lever 1610 is then radially aligned to extend between the two rotation stops 1510 as shown in FIG. 31. Then, tool handle 1600 is snap fit into the retaining arm 1590 so that the bearing surface 1520 surrounds tool handle 1600 and the retaining arm 1590 deflects or snaps back to its original position to retain tool handle 1600 therein as shown in FIGS. 32-33.

Figure 34:
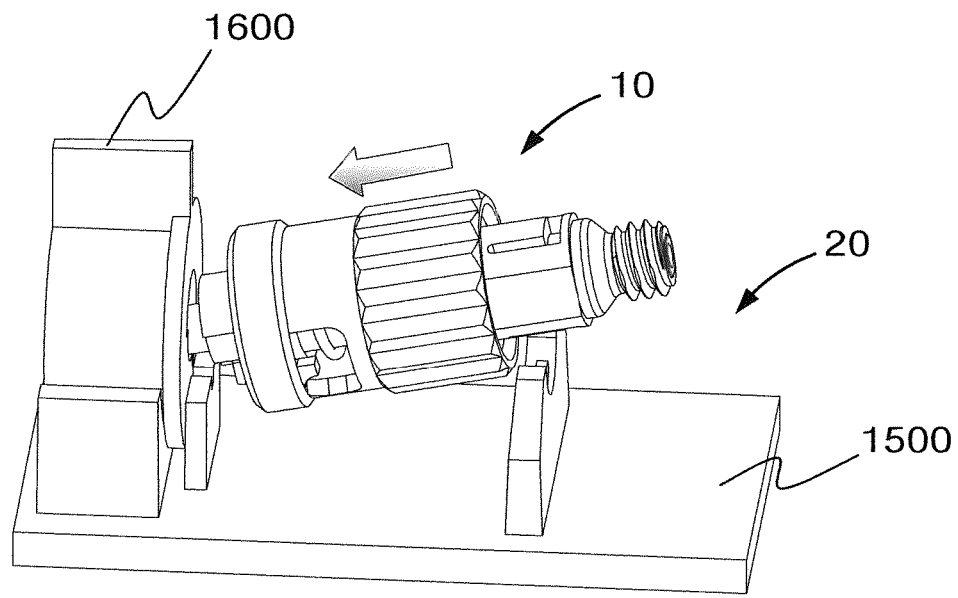
FIGS. 34-35 show installation of a re-terminable fiber optic connector onto the cam activation tool assembly.
Figure 35:
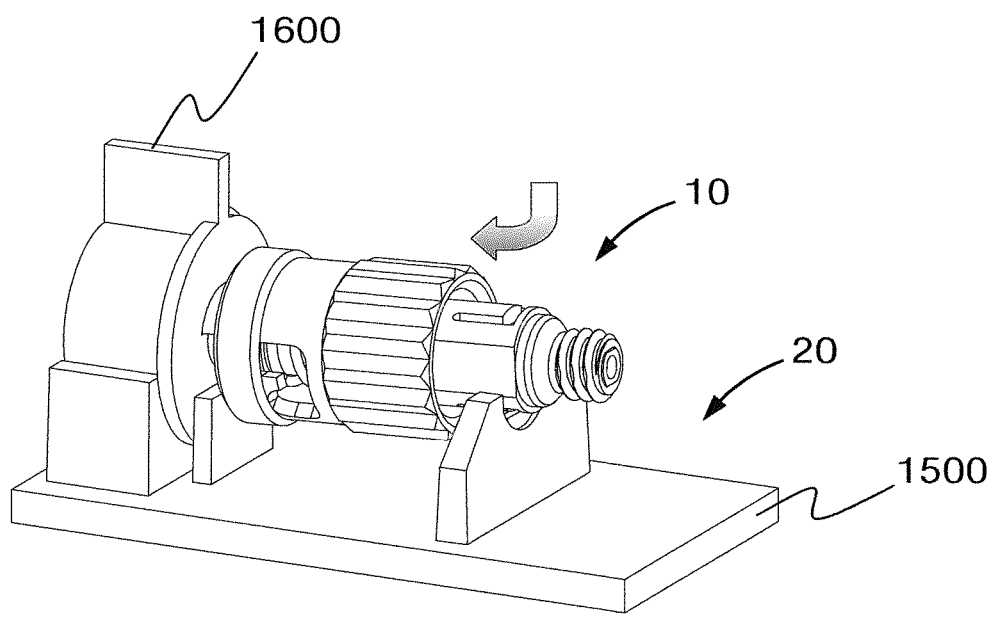

Use of the tool 20 to terminate an optical fiber connector will be described with reference to FIGS. 34-40. Referring to FIG. 34, cam lever 1610 is positioned to a first position, such as against one stop 1510 in the vertical position as shown. This is the default de-activation position. An assembled optical connector 10 such as the one described in FIGS. 1-26 is then placed in the tool 20. In particular, ferrule 1100 of connector 10 is inserted into through hole 1650 as shown in FIG. 34. Connector 10 is then rotated and aligned so that the ferrule holder alignment key 730 fits within anti-rotation slot 1530 of base 1500. The cam activation tool interface 1630 then is engaged with the cam activation cutout 210. Then, backbone 300 of connector 10 is positioned on the tool so that its anti-rotation flats 310 are aligned with the anti-rotation flats 1540 of base 1500. The connector backbone 300 now fits around guide post 1550 to prevent axial movement relative to base 1500 as shown in FIG. 35.

At this point, the connector is ready for maintaining forward pressure. Field termination can be achieved by stripping of an optical fiber and insertion of the fiber into the connector 10. Then, a VFL patch cord 30 (FIG. 40) may be mated to the ferrule 110 protruding through the tool's through hole 1650.

Figure 36:
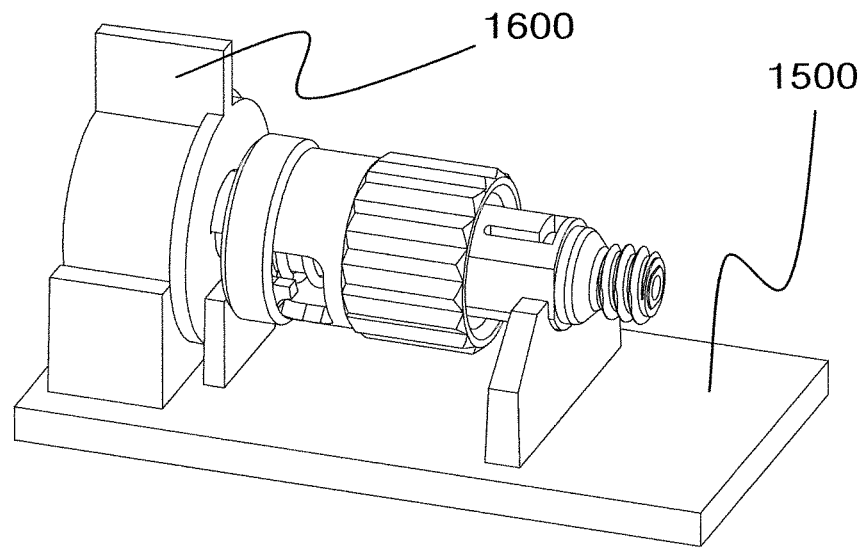
FIG. 36 shows an installed re-terminable fiber optic connector in the cam activation tool assembly with the cam activation tool located in a first position.
Figure 37:
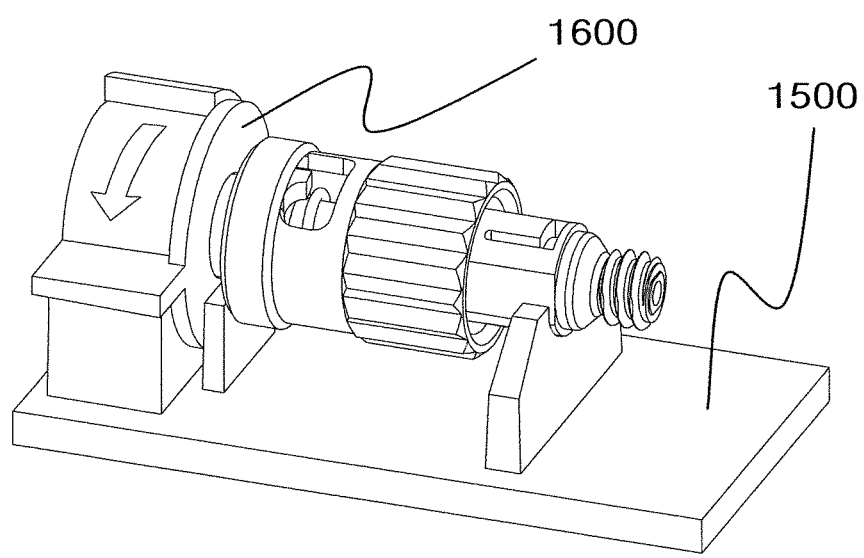
FIG. 37 shows the installed re-terminable fiber optic connector in the cam activation tool assembly with the cam activation tool located in a rotated second position.
Figure 39:
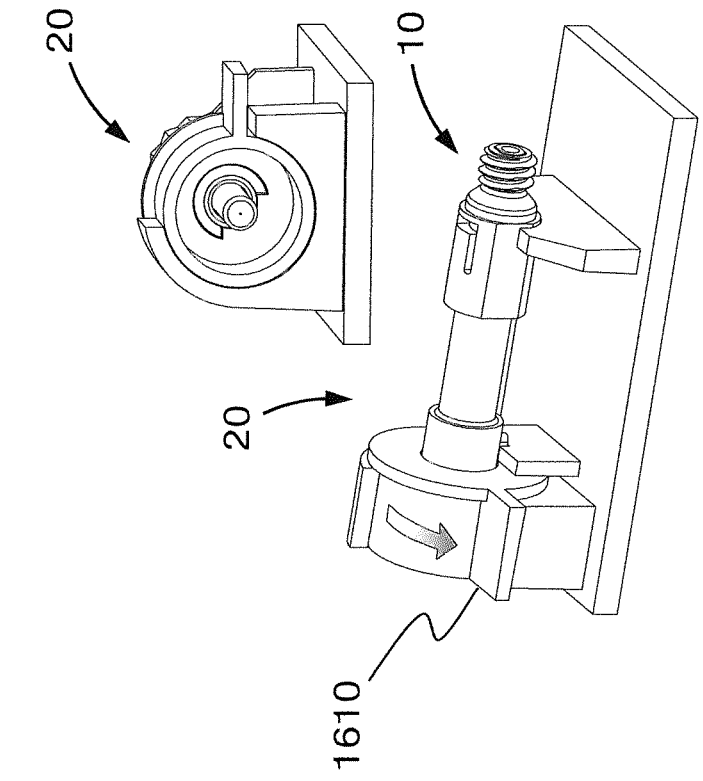
FIG. 39 shows the installed re-terminable fiber optic connector in the cam activation tool assembly of FIG. 38 with the connector bayonet and spring removed to show internal parts when the cam activation tool is located in the second position.
Figure 38:
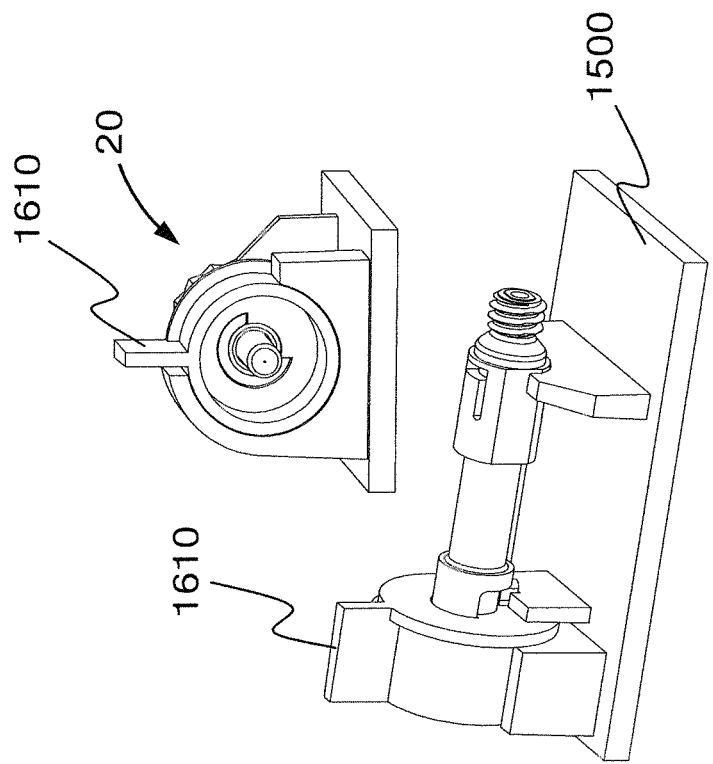
FIG. 38 shows the installed re-terminable fiber optic connector in the cam activation tool assembly of FIG. 37 with the connector bayonet and spring removed to show internal parts.

Termination (activation) is achieved by holding of the base 1500 of the tool and rotating the cam activation tool handle lever 1610 from the first de-activation position shown in FIG. 36 to the rotated activation position shown in FIG. 37, which is parallel to base plate 1560. Rotation of lever 1610 is stopped at the rotated position by stop 1510. Ferrule holder 700 and backbone 300 are held fixed relative to base 1500 by the anti-rotation slot 1530 engaging with alignment key 730, base anti-rotation flats 1540 engaging with backbone anti-rotation flats 340, and guide post 1550 engaging with backbone 300. However, because of the interface between cam activation tool interface 1530 and the connector cam activation cutout 210, the connector cam 200 rotates with rotation of tool portion 1600. Thus, rotation of tool handle 1600 results in relative rotation of cam 200 relative to ferrule holder 700 and backbone 300. This completes activation of the cam and pressing of the optical fiber stub 1000 between planks 800, 900 as shown in FIG. 26.

To remove connector 10 from the tool, backbone 300 is first lifted off of base guide post 1550 and then the connector is slid back out of the tool.

Because there is no crimp for termination, this type of connector is capable of reversing the activation process to allow removal of the optical fiber, should the need arise. For example, in the event of a poor termination, improper alignment, or fiber breakage. This is achieved by placing the lever 1610 in the horizontal, activated position. Then, the connector is inserted into tool 20 so again the cam activation cutout 210 fits into the cam tool interface 1630 as described above. Then, the ferrule holder alignment key 720 and backbone 300 are positioned as described previously. Cam activation lever 1610 is then rotated upwards back to the first, vertical de-activation position. Stop 1510 limits rotation of the lever. The connector cam 200 has now been rotated by 90° relative to the ferrule holder 700 and backbone 300 to allow removal of the optical fiber from the connector and subsequent re-termination of another optical fiber, if desired.

The exemplary embodiments set forth above are intended to be illustrative and not limiting. For example, although the cam activation tool 20 can be used alone for connector activation, cam activation tool 20 can also form part of a termination tool 40, such as an Opti-Cam termination tool shown in FIG. 40. In the FIG. 40 embodiment, base 1500 would be integrated into or otherwise affixed to termination tool 40. A VFL patchcord 30 is connectable between termination tool 40 and an activated or terminated electrical connector to test the termination.

In accordance with another embodiment illustrated in FIGS. 41-45, a re-terminable ST-type fiber optic connector assembly is provided that is similar to previous embodiments. However, this embodiment includes an additional feature to prevent rotation of the bayonet relative to the connector system when it is not installed in a corresponding ST-type receptacle. This is particularly advantageous to enhance the functionality of an OptiCam ST connector, but may also be used in other ST-type connectors.

Figure 42:
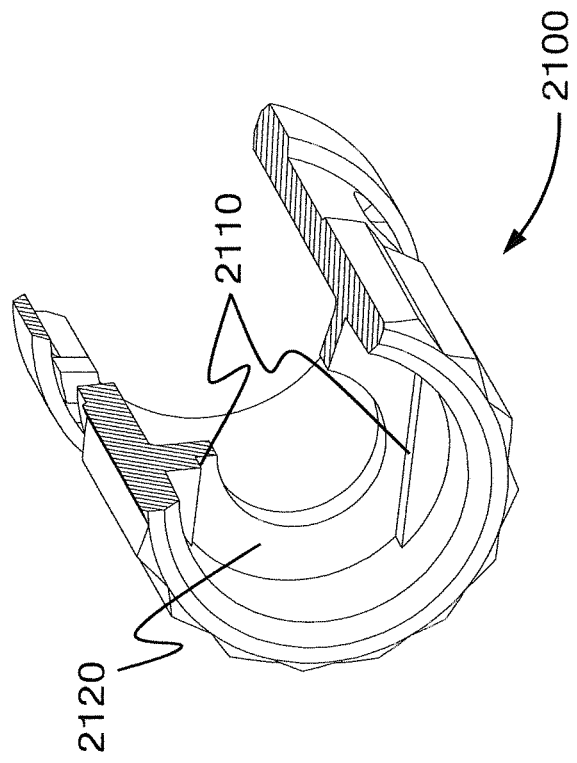
FIG. 42 shows a partial cross-sectional view of the bayonet of FIG. 41.
Figure 41:
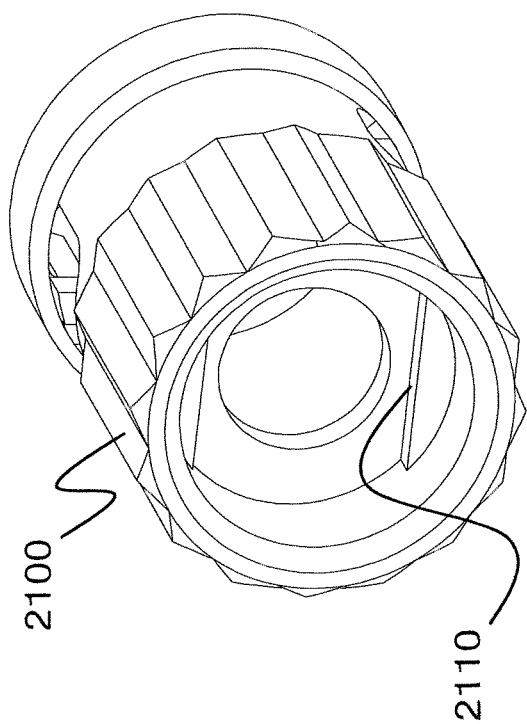
FIG. 41 shows a perspective view of an exemplary bayonet for an ST-type fiber optic connector according to a further embodiment of the invention.

FIG. 41 shows a bayonet 2100 for an ST-type fiber optic connector 2000 to be described later with reference to FIG. 43. Bayonet 2100 includes a knurled outer portion and an interior opening that includes a plurality of bayonet anti-rotation flats 2110 that are preferably opposed to one another. Bayonet flats 2110 are oriented to mate with corresponding backbone anti-rotation flats 2310 provided on backbone 2300 (FIG. 44). Bayonet 2100 also includes a bayonet retaining flange 2120 (FIG. 42).

Backbone 2300 is oriented so that backbone flats 2310 are aligned with and parallel to the bayonet anti-rotation flats 2110. This allows a front surface 2320 of the backbone to extend between the flats 2110 and against the bayonet retaining flange 2120. Contact between the front surface 2320 and the retaining flange 2120 is maintained by pressure exerted by the compression spring (unshown). This mechanically aligns the backbone 2300 with a connector system key 2720 provided on a ferrule holder 2700 (FIG. 43) and with bayonet 2100 to prevent relative rotation. The ferrule holder 2700 and the backbone 2300 have their orientation maintained fixed as described in earlier embodiments.

In certain designs, such as in the FIG. 1 embodiment, the end user grips the portion of the backbone that protrudes from the bayonet while screwing on the strain relief boot. However, the limited amount of backbone exposure makes it difficult to obtain a good grip by fingers alone. The user cannot grip the bayonet alone because the bayonet in this embodiment is allowed to spin relative to the backbone. Therefore, it may be difficult to thread and tighten the strain relief boot onto the backbone.

This potential problem is solved in the illustrated embodiment of FIGS. 41-45 by mechanically aligning and restraining movement of the backbone 2300 relative to the bayonet 2100. Thus, a user may now readily grip the bayonet 2100 while screwing the strain relief boot 2500. This design provides significantly more surface area to grip (i.e., the entire bayonet surface area) to perform such an operation and does not result in an inadvertent rotation of the bayonet 2100.

Also in certain designs, such as the FIG. 1 embodiment, an end user has to align the bayonet to ST receptacle latching studs, such as studs 2820 in FIG. 45. However, when inserting a typical ST connector system into a ST receptacle 2800, the end user must first rotate the connector system axially until the connector system key is aligned with the ST receptacle alignment slot. The user then has to insert the connector system further into the ST receptacle until the bayonet contacted the ST receptacle latching studs. The user then rotates the bayonet axially until bayonet clearance slots are aligned with the latching studs before the bayonet can be latched to the ST receptacle. This somewhat cumbersome operation can be simplified by the embodiment of FIGS. 41-45.

One benefit to maintaining the alignment of the backbone 2300 to the connector system key 2720 as described in FIGS. 41-45 is that bayonet clearance slots 2130 (FIG. 43) are already aligned to latching studs 2820 of ST receptacle 2800 once the connector system key 2720 is aligned to alignment slots 2810 of the ST receptacle 2800 (FIG. 45). This simplifies the insertion of the connector system into the receptacle.

An additional feature of the FIG. 41-45 embodiment is that during the latching operation, bayonet 2100 is biased toward ST receptacle 2800 by the internal compression spring. This allows the backbone anti-rotation flats 2310 to disengage from the bayonet anti-rotation slots 2110, allowing bayonet 2100 to rotate axially and latch to the ST receptacle 2800. The process also works in reverse during unlatching so that when the connector system is unlatched and removed from the ST receptacle 2800, the anti-rotation flats 2110 on bayonet 2100 align with the anti-rotation flats 2310 on the backbone 2300.

Various changes can be made without departing from the spirit and scope of the appended claims. Therefore, the connectors, activation tools and assembly methods described are intended to embrace all known, or later-developed, alternatives, modifications, variations, and/or improvements.

The invention claimed is:

1. A reversible fiber optic connector for applying strain relief to a field fiber terminated within comprising:
    a ferrule holder having an alignment key extending radially outward at a first end, the ferrule holder further having an integral lever arm with a surface raised above a remainder of a surface of the ferrule holder;
    a cam configured to at least partially enclose the ferrule holder, the cam having an inner surface configured to provide a compressive force on the integral lever arm when the cam is rotated relative to the ferrule holder such that a compressive force is applied to the field fiber, the cam also having a cutout at a first end, the cutout configured to define an allowable degree of rotation of the cam relative to the ferrule holder via an interaction between the cutout of the cam and the alignment key of the ferrule holder.

2. The reversible fiber optic connector of claim 1, further including a backbone attached to the ferrule holder, the backbone being fixed in rotation relative to the ferrule holder.

3. The reversible fiber optic connector of claim 1, further including a bayonet at least partially enclosing the cam.

4. The reversible fiber optic connector of claim 1 further comprising a ferrule at least partially enclosed by the ferrule holder, the ferrule having a stub fiber enclosed within.

5. The reversible fiber optic connector of claim 4 wherein the rotation of the cam relative to the ferrule holder reversibly terminates the stub fiber to the field fiber simultaneously to applying strain relief to the field fiber.

* * * * *